Jan. 28, 1958 L. H. SPOTT 2,821,616
METHOD AND APPARATUS FOR MAKING HONEYCOMB MATERIAL
Filed Aug. 15 1955 9 Sheets-Sheet 1

INVENTOR.
LOUIS H. SPOTT
BY Mellin and Hanscom
ATTORNEYS

Jan. 28, 1958     L. H. SPOTT     2,821,616
METHOD AND APPARATUS FOR MAKING HONEYCOMB MATERIAL
Filed Aug. 15 1955     9 Sheets-Sheet 2
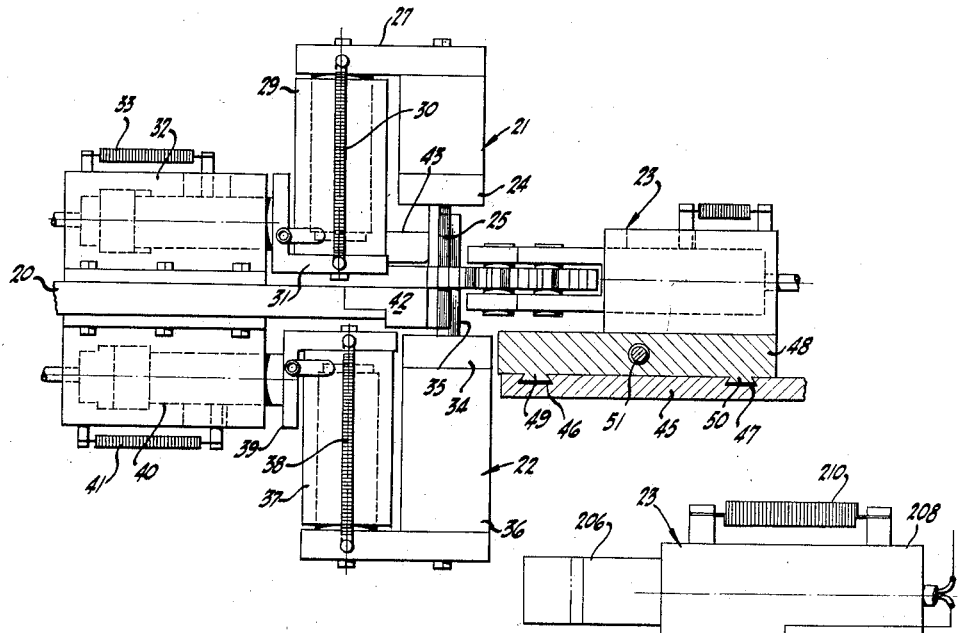
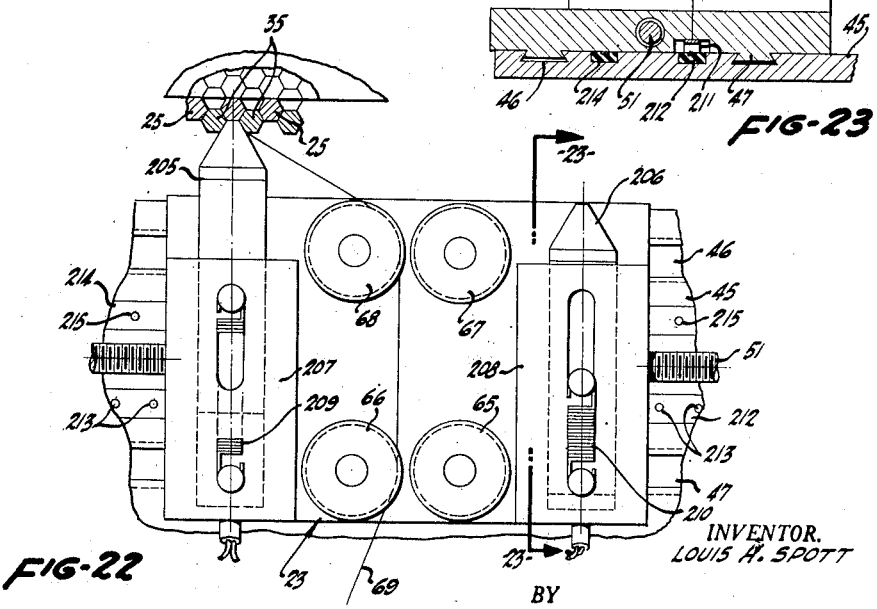
INVENTOR.
LOUIS H. SPOTT
BY
Mellin and Hanscom
ATTORNEYS Jan. 28, 1958     L. H. SPOTT     2,821,616
METHOD AND APPARATUS FOR MAKING HONEYCOMB MATERIAL
Filed Aug. 15 1955     9 Sheets-Sheet 3
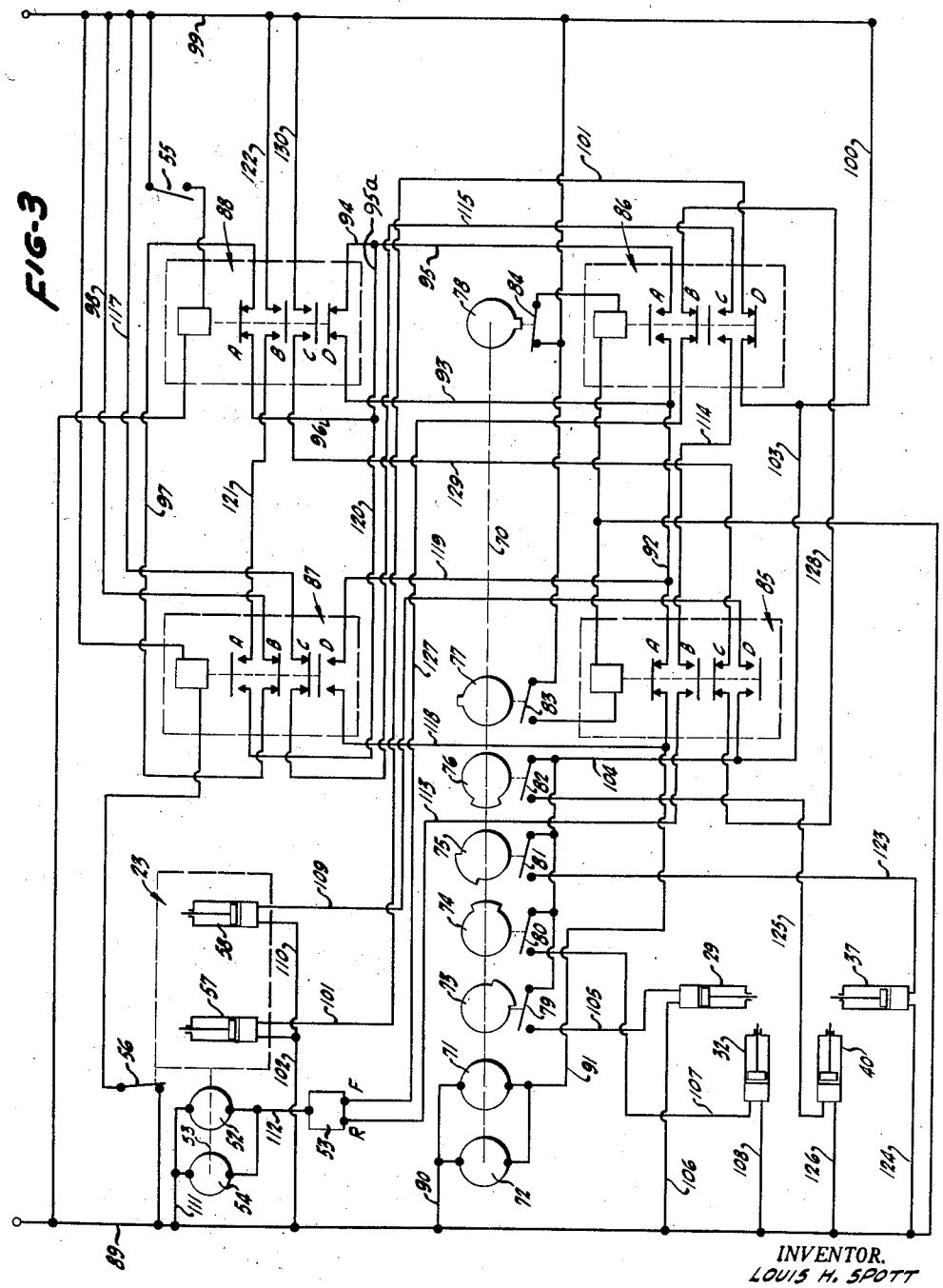
INVENTOR.
LOUIS H. SPOTT
BY
Mellin and Hanscom
ATTORNEYS Jan. 28, 1958 L. H. SPOTT 2,821,616
METHOD AND APPARATUS FOR MAKING HONEYCOMB MATERIAL
Filed Aug. 15 1955 9 Sheets-Sheet 4

INVENTOR.
LOUIS H. SPOTT
BY
Mellin and Hanscom
ATTORNEYS.

Jan. 28, 1958 L. H. SPOTT 2,821,616
METHOD AND APPARATUS FOR MAKING HONEYCOMB MATERIAL
Filed Aug. 15 1955 9 Sheets-Sheet 5
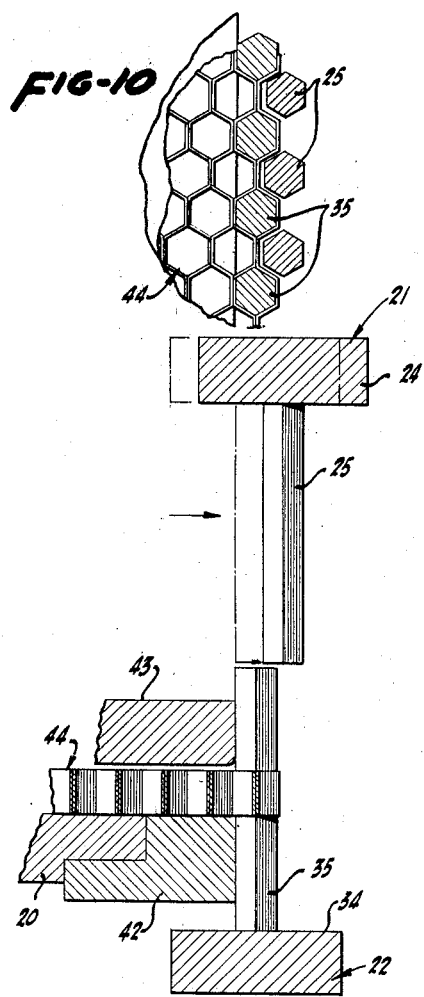
FIG-10
FIG-6
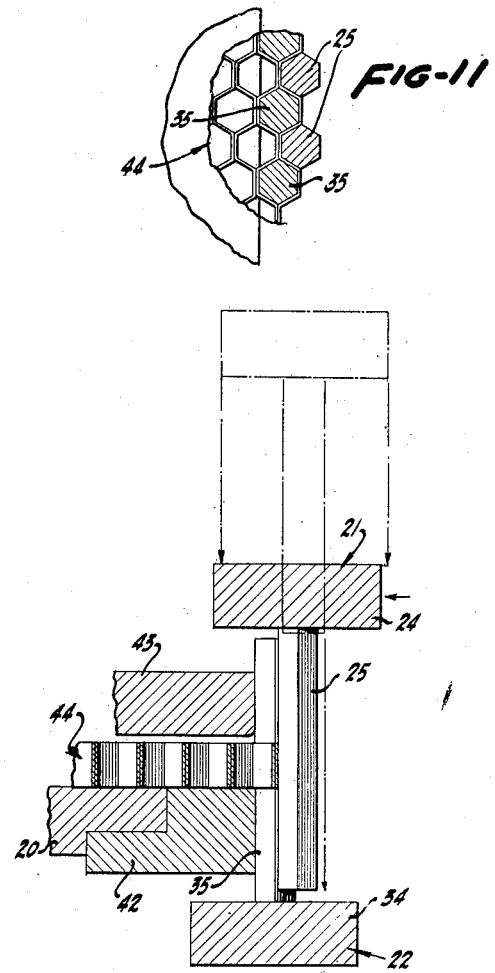
FIG-11
FIG-7
INVENTOR.
LOUIS H. SPOTT
BY
Mellin and Hanscom
ATTORNEYS Jan. 28, 1958      L. H. SPOTT      2,821,616
METHOD AND APPARATUS FOR MAKING HONEYCOMB MATERIAL
Filed Aug. 15 1955      9 Sheets-Sheet 6
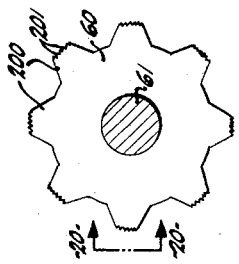
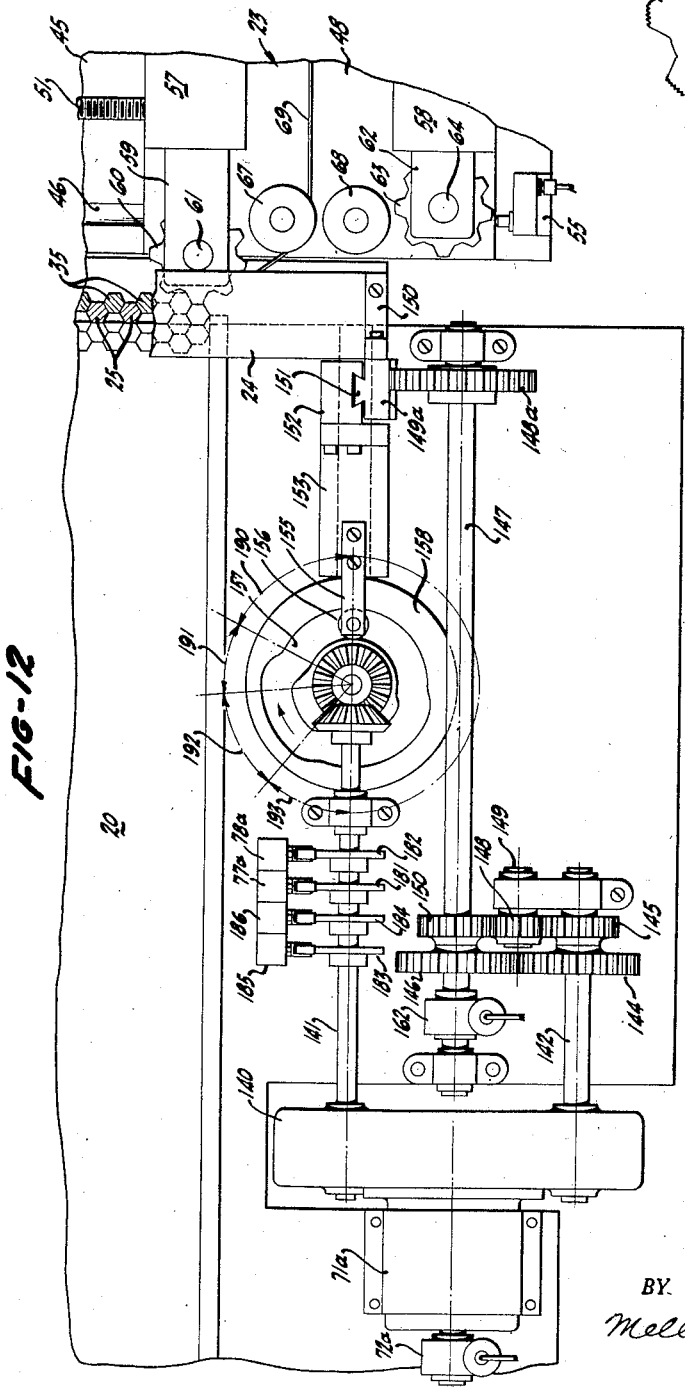
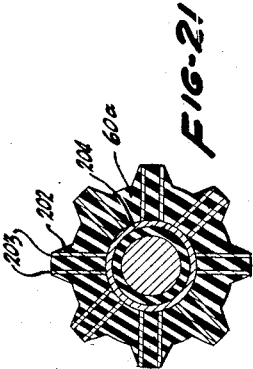
INVENTOR.
LOUIS H. SPOTT
BY
Mellin and Hanscom
ATTORNEYS

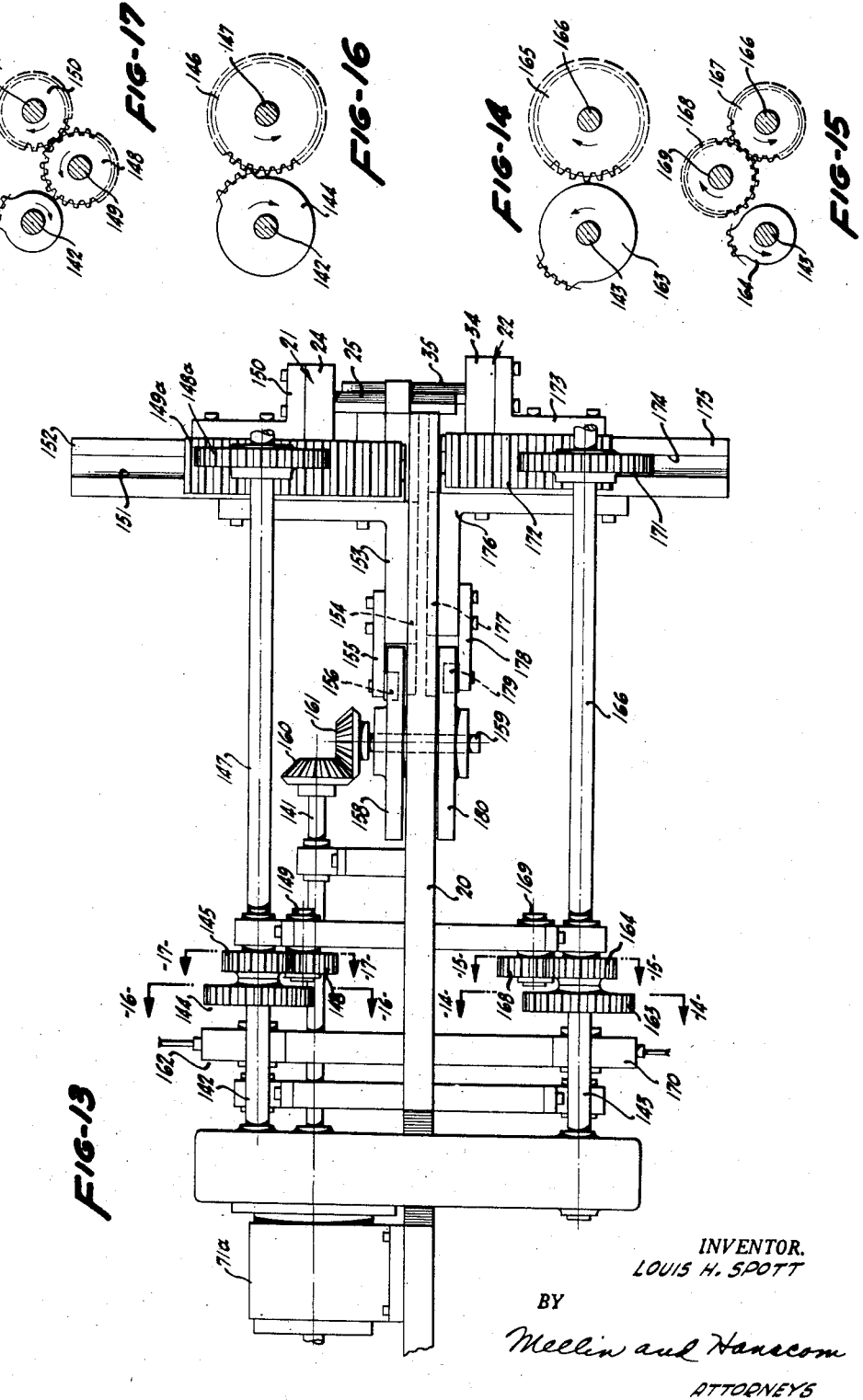

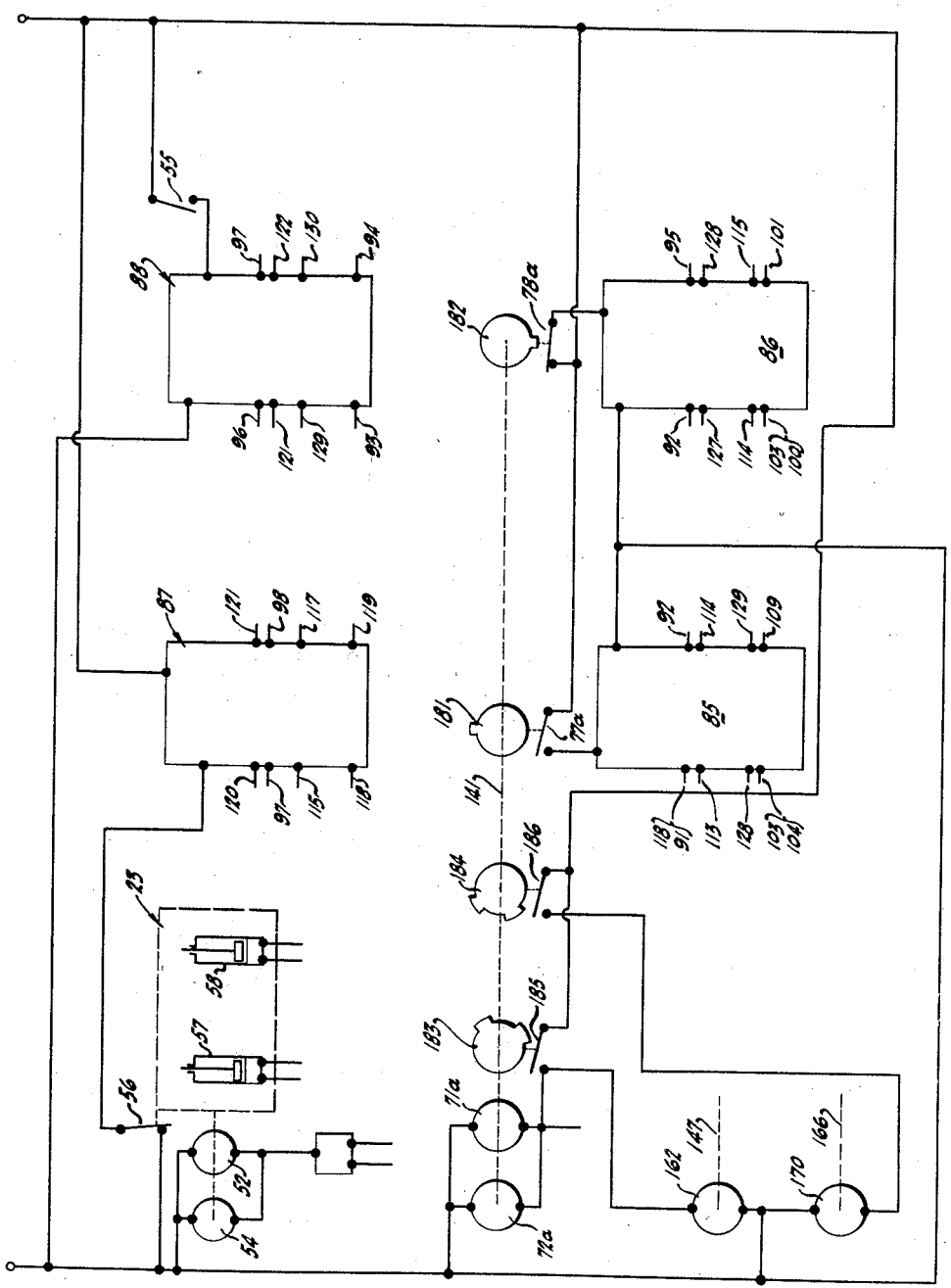

Jan. 28, 1958   L. H. SPOTT   2,821,616
METHOD AND APPARATUS FOR MAKING HONEYCOMB MATERIAL
Filed Aug. 15 1955   9 Sheets-Sheet 9

INVENTOR.
LOUIS H. SPOTT
BY
Mellin and Hanscom
ATTORNEYS

United States Patent Office 2,821,616
Patented Jan. 28, 1958.

2,821,616

METHOD AND APPARATUS FOR MAKING HONEYCOMB MATERIAL

Louis H. Spott, Walnut Creek, Calif.

Application August 15, 1955, Serial No. 528,276

21 Claims. (Cl. 219—78)

This application relates to a method and apparatus for forming a honeycomb-like cellular structure. More particularly, the invention is directed to a method and apparatus for forming a continuous narrow strip of foil metal into a sheet of material the same thickness as the width of the strip, said sheet being composed of a plurality of symmetrical cells extending transversely through the sheet of material in the manner of a honeycomb.

In the building of structures, and particularly in the construction of aircraft, it is very desirable to use panels which are relatively strong and at the same time relatively light in weight. One method of making such a panel is to take a honeycomb or cellular filler material and sandwich it between two skin plates of sheet metal. Aluminum, being light in weight and at the same time relatively strong, is ideally suited for such panels.

It is the principal object of this invention to provide a novel method of fabricating the filler, or cellular structure, used in the making of panels such as those described above.

A further object of the invention is to provide a method as set forth in the previous object wherein the material is formed from a continuous strip of aluminum foil, which strip is trained back and forth to form successive rows of cells and the contiguous surfaces of the material between cells are welded together to fabricate the material row-by-row in a continuous operation.

Another object of the invention is to provide an apparatus wherein a reciprocally mounted carriage moves back and forth to train a strip of aluminum foil backward and forward relative to a plurality of forming fingers, and wherein means are provided for welding the foil to the previous row wherever the two rows touch each other.

Still another object is to provide an apparatus according to the previous object wherein the welding is done by the "Koldweld" process.

The preferred embodiments of the invention are described in the following detailed specification, and illustrated by way of example in the accompanying drawings, wherein:

Fig. 2 is a side elevation of the machine shown in Fig. 1.

Fig. 3 is a schematic wiring diagram for the modification shown in Figs. 1 and 2.

Figs. 4, 5, 6 and 7 are fragmentary views showing the manner in which one set of forming fingers moves relative to the other after the completion of one row of hex cells.

Figs. 8, 9, 10 and 11 are plan views corresponding to Figs. 4, 5, 6 and 7, respectively.

Fig. 12 is a plan view similar to that shown in Fig. 1 and illustrates a modified form of the invention.

Fig. 13 is a side view of the modification shown in Fig. 12.

Figs. 14, 15, 16 and 17 are sectional views taken on lines 14—14, 15—15, 16—16 and 17—17, respectively, of Fig. 13.

Fig. 18 is a partial wiring diagram for the modification illustrated in Figs. 12 to 17, inclusive, showing the portion of the wiring diagram which differs from the wiring diagram shown in Fig. 3.

Figure 1:
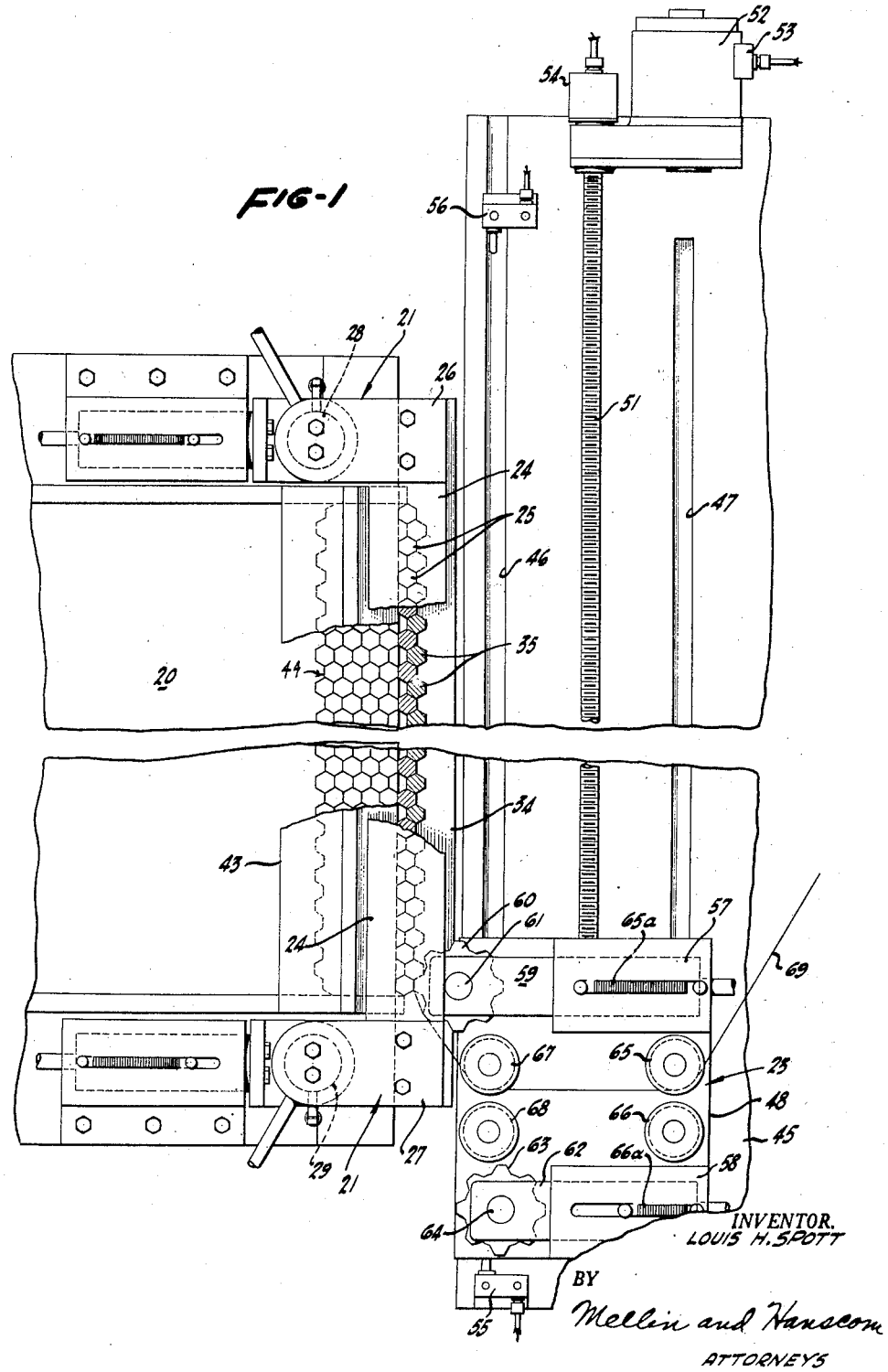
Fig. 1 is a plan view of a machine embodying the principles of the invention.

Fig. 19 is a view of one of the forming sprockets shown in Figs. 1 and 2 and illustrates the configuration of the teeth thereon.

Fig. 20 is a plan view of the end of one of the teeth of the sprocket wheel shown in Fig. 19.

Fig. 21 is a sectional view of another form of sprocket.

Fig. 22 is a plan view of an additional modified cell forming mechanism.

Fig. 23 is a sectional view taken on line 23—23 of Fig. 22.

Figure 24:
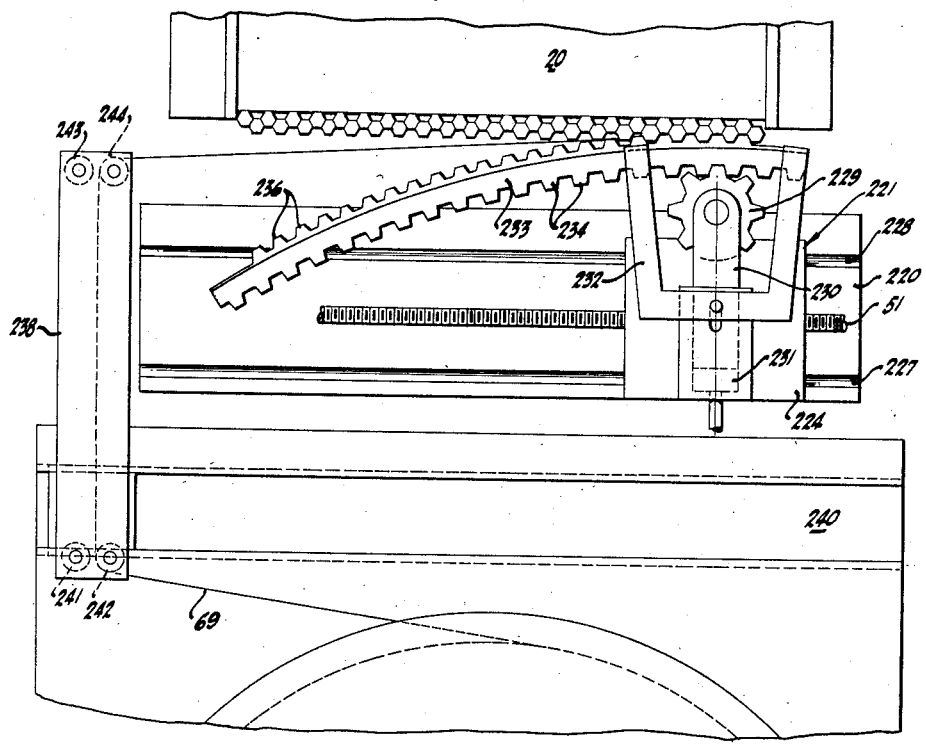
Figure 25:
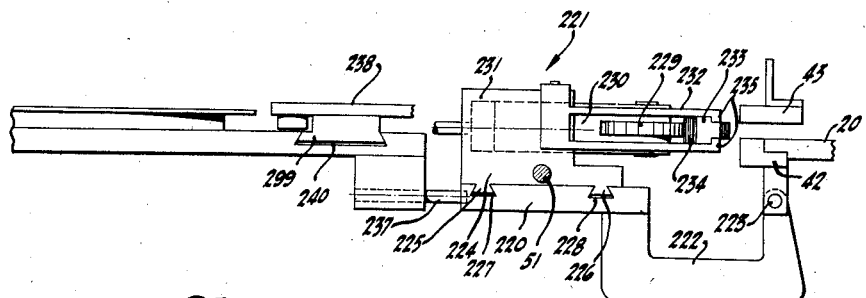

Figs. 24 and 25 illustrate a plan and end view, respectively, of another modified form of carriage and cell forming mechanism.

Referring now to the drawings, wherein similar reference numerals are used to denote the same elements throughout the various views shown, and referring more particularly to Figs. 1 and 2 thereof, the machine comprises generally a table 20, a pair of forming finger assemblies 21 and 22, and a reciprocating feeding, forming and welding carriage 23. The finished honeycomb structure as it is formed moves from right to left as viewed in Figs. 1 and 2 across the upper surface of the table 20.

The upper finger assembly 21 comprises a horizontally extending bar 24 adjacent the forward edge of the table 20. A plurality of hexagonal-shaped fingers 25 are fixed to and extend downwardly from the bar 24 at spaced points therealong. The opposite ends of the bar 24 are fixed to suitable brackets 26 and 27, each of which is fastened to one of the pistons of two vertically extending solenoid operated air or hydraulic cylinders 28 and 29, respectively.

Since the mechanism for actuating the finger assembly 21 is the same on both sides of the machine, only that actuating the near side, as viewed in Fig. 2, will be described in detail. As set forth above, the solenoid operated cylinder 29 is adapted, through the bracket 27, to raise the bar 24 and the fingers 25 attached thereto. A spring 30, fixed at one end to the bracket 27 and at its other end to a bracket 31 fixed to the cylinder 29, is adapted to lower the fingers 25 when the air is released from the cylinder 29.

The cylinder 29 is mounted on the bracket 31 which in turn is mounted for limited sliding movement forwardly and rearwardly of the table 20. The bracket 31 is connected to the piston of a second solenoid air or hydraulic cylinder 32 mounted horizontally with its axis parallel to the direction of travel of the finished material. The cylinder 32 is fixed to the table 20. A spring 33 is connected at one end to the piston and at the other end to the cylinder, whereby the bracket 31 will be moved to the left when the air or hydraulic fluid is released from the cylinder 32.

Figure 8:
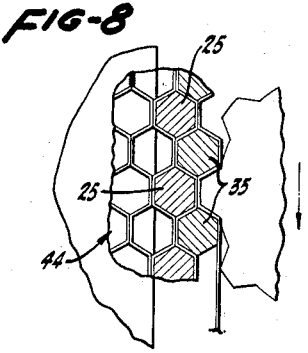
Figure 9:
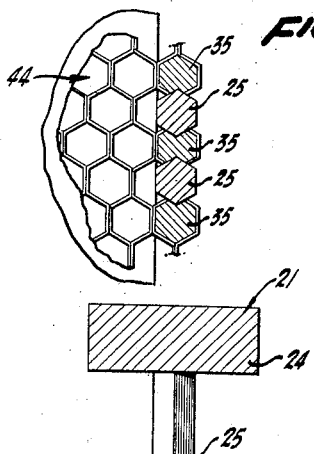

The lower finger assembly 22 comprises a horizontally extending bar 34 having a plurality of upwardly extending hexagonal fingers 35 fixed at spaced points therealong. The fingers 35 are staggered with respect to the fingers 25, whereby the fingers 25 on the bar 24 and the fingers 35 on the bar 34 are adapted to nest with each other in the manner shown in Figs. 1, 8 and 11.

Again, since the mechanism for moving the lower fingers 35 is the same on both sides of the table 20, only the mechanism on the near side, as viewed in Fig. 2, will be described in detail. The end of the bar 34 is fixed to a bracket 36 which in turn is fastened to the piston of a vertically mounted solenoid operated air or hydraulic cylinder 37. The air cylinder, when actuated, is adapted to move the bar 34 and the fingers 35 downwardly. When the air or hydraulic fluid is released, the bar 34 is moved upwardly by a return spring 38. The cylinder 37 is mounted on a bracket 39 guided for limited sliding movement relative to the table 20, and fixed to the piston of a horizontally mounted solenoid operated air or hydraulic cylinder 40, the latter being fixed to the underside of the table 20. A return spring 41 is adapted to return the cylinder 40 to its home position.

The forwardmost edge of the table 20 is provided with a metal bearing block 42. A second bearing block 43 is adjustably mounted in parallel spaced relation above the block 42 so that its forward edge is in the same vertical plane with the forward edge of the block 42. The rearmost sides of the fingers 25 or 35 (whichever is rearmost at the time) are adapted to bear against the forward edges of the bearing blocks 42 and 43. The finished product, indicated at 44, is adapted to pass between the bearing blocks 42 and 43 in the manner shown in Figs. 4, 5, 6 and 7.

The carriage mechanism 23 comprises an auxiliary horizontally extending carriage table 45 mounted forwardly of the main table 20, and having two transversely extending dovetail guide grooves 46 and 47 formed in its upper surface, the guide grooves 46 and 47 being parallel to the forward edges of the bearing blocks 42 and 43. A carriage frame 48, having two dovetail extensions 49 and 50 on its lower surface, is mounted for sliding movement in the grooves 46 and 47. A lead screw 51 is rotatably mounted in suitable bearings (not shown) on the auxiliary table 45 and threadedly engages the frame 48 whereby, when the lead screw 51 is rotated, the carriage frame 48 is moved laterally with respect to the table 20.

A reversible motor 52 is geared to the lead screw 51 and provided with a reversing starter 53, whereby the motor 52 and the lead screw 51 may be started in either direction to selectively move the carriage frame 48 in either direction. The lead screw 51 is provided with a normally engaged solenoid releasable brake 54 wired in parallel with the motor 52, whereby the lead screw is held stationary whenever the motor 52 is not operating. A pair of limit switches 55 and 56 are mounted on the auxiliary table 45 in the path of movement of the carriage frame 48 to be actuated thereby one at each of the extreme ends of the travel of said frame. The function of the limit switches 55 and 56 will be described hereinbelow in conjunction with the wiring diagram shown in Fig. 3.

Mounted on the carriage frame 48 are two solenoid actuated air or hydraulic cylinders 57 and 58. The cylinder 57 is provided with a piston 59 bifurcated at its outer end and having a forming and welding sprocket 60 mounted for rotation on a pin 61 extending through the bifurcated end thereof. Similarly, the cylinder 58 is provided with a bifurcated piston 62 having a second forming and welding sprocket 63 rotatably mounted on a pin 64. The piston 59 and cylinder 57 are provided with a retracting spring 65a, and the piston 62 and cylinder 58 with a retracting spring 66a. One pair of guide rollers 65 and 66 is rotatably mounted on the carriage frame 48 between the cylinders 57 and 58 adjacent the forward edge of the carriage frame 48, and a second pair of guide rollers 67 and 68 is rotatably mounted on the frame 48 adjacent the rearward edge thereof. The strip of foil 69 to be fabricated is fed from a suitable supply roll (not shown) between the rollers 65 and 66 and between the rollers 67 and 68 in the manner shown in Fig. 1.

A timing shaft 70, shown schematically in Fig. 3, is rotatably mounted at any convenient point on the frame of the machine and is adapted to be driven through suitable reduction gearing by a timing motor 71. A normally engaged solenoid releasable brake 72 engages the shaft 70 and is wired in parallel with the motor 71. Six timing cams 73, 74, 75, 76, 77 and 78 are mounted on the timing shaft 70 and are adapted to actuate six microswitches 79, 80, 81, 82, 83 and 84, respectively. The switch 79 controls the actuation of the solenoid controlled air cylinder 29 and its associated cylinder at the opposite side of the frame. The switch 80 actuates the solenoid controlled air cylinder 32 and its associated cylinder at the opposite side of the frame. The switch 81 actuates the solenoid controlled air cylinder 37 and its associated cylinder at the opposite side of the frame, and the switch 82 actuates the solenoid controlled cylinder 40 and its associated cylinder at the opposite side of the frame. The switches 83 and 84 are adapted to actuate two normally de-energized four pole relays 85 and 86, respectively. The two relays 85 and 86 are identical, and each has four sets of contacts labeled respectively A, B, C and D. The A and C contacts are normally closed, and the B and D contacts normally open.

The limit switches 55 and 56 are normally closed switches adapted to control two additional relays 87 and 88, respectively. The relays 87 and 88 are identical with the relays 85 and 86, with the exception that the relays 87 and 88 are normally energized except when the limit switch associated therewith is actuated.

The operation of the modification thus far described is as follows: The cycle is shown at the point illustrated in Fig. 1, wherein the carriage 23 has just reached the lower end of its travel and actuated the limit switch 55. At this point the timing shaft 70 is in the position wherein switches 79, 80, 81, 82 and 83 are open and switch 84 is closed. Relays 87 and 86 are energized or up, and relays 85 and 88 are de-energized or down. When the relay 88 is de-energized (by the actuation of the limit switch 55), the carriage drive motor 52 and solenoid brake 54 are de-energized in a manner to be described. The timing motor 71 and the timing shaft brake 72 are energized through the following circuit: from one side 89 of the line voltage through line 90, line 91, relay 85A, line 92, line 93, relay 88D, line 94, line 95A, line 96, relay 88A, line 97, relay 87B, and line 98 to the opposite side 99 of the line voltage.

As soon as the shaft 70 starts to turn, the switch 84 is opened and the relay 86 is de-energized. This does not affect the operation of the timing motor, since this relay is not in the circuit to the motor 71 at this time. However, the de-energizing of the relay 86 opens the contacts 86D and de-energizes the cylinder 57 on the carriage 48 and permits the sprocket 60 to retract. The circuit to the cylinder 57 is from one side 99 of the line voltage through line 100, relay 86D, line 101, cylinder 57, and line 102 to the opposite side 89 of the line voltage.

Figure 4:
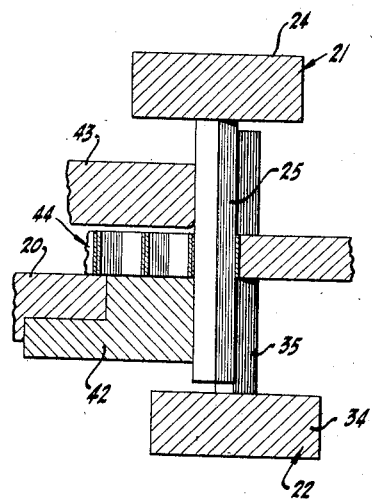
Figure 5:
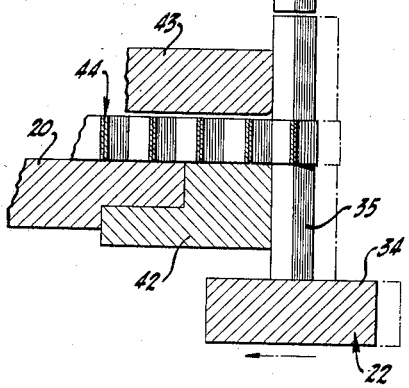

As the shaft 70 continues to rotate, the switch 79 is actuated, and through the circuit including line 100, line 103, line 104, switch 79, line 105, cylinder 29, and line 106, actuates the cylinder 29 to raise the upper finger assembly 21 from the position shown in Fig. 4 to that shown in Fig. 5. As soon as the fingers 25 clear the ends of the fingers 35, the spring 41 on the cylinder 40 moves the fingers 35 from the position shown in Fig. 4 to that shown in Fig. 5. While the cylinder 29 is still actuated, the switch 80 is closed by the cam 74 to actuate the cylinder 32 through the circuit including line 100, line 103, line 104, switch 80, line 107, cylinder 32, and line 108. When the cylinder 32 is actuated while the cylinder 29 is still actuated, the upper finger assembly 21 is moved from the position shown in Fig. 5 to that shown in Fig. 6. When the switch 79 opens, the spring 30 on the cylinder 29 moves the fingers 25 downwardly to the position shown in dash lines in Fig. 7, and when the switch 80 opens, the fingers 25 are moved rearwardly to intermesh with the fingers 35 in the manner shown in full lines in Fig. 7 by the retracting spring 33 on the cylinder 32.

At the end of 180° of rotation of the timing shaft 70, the switch 83 is closed by the cam 77 to energize the relay 85. When the relay 85 picks up, the contacts 85A open to open the circuit to the timing motor 71 and the solenoid brake 72, thus stopping the motor 71 and setting the brake 72 to hold the timing shaft 70 in this position. At the same time, the contacts 85D close to close the circuit including line 100, line 103, relay 85D, line 109, cylinder 58, line 110, and line 102 to actuate the cylinder 58 to advance the sprocket 63 to its active position.

At the same time, the carriage motor 52 and the carriage drive brake 54 are energized through the reverse terminal R of the reversing starter 53 to rotate the carriage motor 52 in its reverse direction to move the carriage 23 upwardly as viewed in Fig. 1. The circuit for the reverse direction of the motor 52 is as follows: from line 89 through line 111, brake 54 and motor 52, line 112 reversing starter 53 terminal R, line 113, relay 85B, line 114, relay 86C, line 115, relay 87C, and line 117 to voltage line 99. As soon as the carriage 23 begins to move upwardly, the limit switch 55 closes and the relay 88 is again energized. This does not effect any change at this time, since this relay is not included in either the circuit to the cylinder 58, or the circuit for reverse drive of the motor 52.

At the end of its travel the carriage 23 opens the limit switch 56 to de-energize the relay 87 and the contacts drop. When the contacts 87C open, the circuit to the carriage motor 52 and the carriage drive brake 54 is opened and the motor stops and the brake sets. The timing motor 71 and the timing motor shaft brake 72 are again actuated through the circuit from voltage line 89 through line 90, motor 71 and brake 72, line 91, line 118, relay 87D, line 119, line 92, relay 86A, line 95, line 120, relay 87A, line 121, relay 88B, and line 122 to voltage line 99.

Rotation of the shaft 70 is again in the same direction as before. The first thing that happens is that switch 83 opens, de-energizing relay 85, opening contacts 85D to de-activate cylinder 58, and permitting retraction of the sprocket 63 by the retracting spring 66a. The cylinder 37 is next actuated to move the lower finger assembly 22 downwardly, then the cylinder 40 is actuated to move the lower finger assembly laterally to the right as viewed in Figs. 2 and 4 through 7, then cylinder 37 is de-activated to permit the retracting spring 38 to raise the lower finger assembly 22, and then the cylinder 40 is de-activated to permit the retracting spring 41 to move the fingers 35 back to the position illustrated in Fig. 4. The action of the cylinders 37 and 40 is controlled by cams 75 and 76 which are identical to but 180° out of phase with the cams 73 and 74 controlling the cylinders 29 and 32 as described above. The circuit for cylinder 37 is from voltage line 99 through line 100, line 103, line 104, switch 81, line 123, cylinder 37, and line 124 to voltage line 89. Similarly the circuit for cylinder 40 is from voltage line 99 through line 100, line 103, line 104, switch 82, line 125, cylinder 40, and line 126 to voltage line 89.

After 180° of rotation, the switch 84 is again closed to energize relay 86. Through the circuit described above, the closing of contacts 85D energizes cylinder 57 to advance the forming sprocket 60. The opening of contacts 86A stops the timing motor 71 and sets the timing shaft brake 72. The carriage drive brake 54 and the carriage motor 52 are energized for rotation in a direction to move the carriage 23 downwardly as viewed in Fig. 1 by the following circuit: from voltage line 89 through line 111, motor 52 and brake 54, line 112, reversing starter 53, terminal F, line 127, relay 86B, line 128, relay 85C, line 129, relay 88C, and line 130 to voltage line 99.

As soon as the carriage starts to move, the limit switch 56 closes and the relay 87 is again actuated. However, this relay is not included in either of the circuits just described, so the cylinder 57 remains actuated and the carriage motor 52 continues to drive the carriage 23 until the limit switch 55 is again actuated to de-energize the relay 88 and start the cycle over again.

Referring now to Figs. 12 to 17, inclusive, the carriage mechanism, and the forming mechanism associated therewith, are the same as those illustrated in Figs. 1 to 11, inclusive. The elements thereof are consequently identified by the same reference numerals. Similarly, the upper and lower finger assemblies 21 and 22, respectively, are the same as those employed in the principal modification. The modification disclosed in Figs. 12 to 17, inclusive, is directed to a mechanical drive mechanism for providing the necessary movements to the finger assemblies 21 and 22.

Referring now to Fig. 12, a motor 71a, having a normally engaged and solenoid releasable brake 72a associated therewith, is connected in driving relation to a transmission assembly indicated at 140 and a similar transmission (not shown) at the opposite side of the table 20. As will appear, the motor 71a is the driving force for moving the finger assemblies 21 and 22, and corresponds to the timing motor 71 of the previous modification. The motor 71a and the brake 72a are wired into the electrical circuit in exactly the same way that the motor 71 and brake 72 were wired in the previous modification.

The finger raising mechanisms associated with the two transmissions is the same on both sides of the machine; therefore, only that on the near side will be described in detail.

Three drive shafts 141, 142 and 143 extend outwardly from the right side of the transmission, as viewed in Figs. 12 and 13, toward the front of the machine. All of the shafts 141, 142 and 143 rotate at the same speed, and the shafts 141 and 142 rotate in one direction while the shaft 143 rotates in the opposite direction.

Fixed to the shaft 142 are two mutilated drive pinions 144 and 145. The pinion 144 is adapted to mesh with a gear 146 fixed to a shaft 147 for driving said shaft in a forward direction whenever the teeth of said mutilated pinion 144 are in mesh with the teeth of the gear 146. The mutilated pinion 145 is adapted, when in mesh, to drive the shaft 147 in a rearward direction through a reversing idler gear 148 rotatably mounted on a stub shaft 149 fixed to the frame of the machine. A normally engaged solenoid releasable brake 162 is mounted on the shaft 147 and holds said shaft stationary at all times when the mutilated pinions 144 and 145 are not in mesh.

A gear 148a on the forward end of the shaft 147 meshes with a vertically extending rack 149a connected by a bracket 150 to the supporting bar 24 of the upper finger assembly 21. The rack 149a is guided for vertical movement by a dovetail connection 151 with a guide member 152 fixed to a bracket 153 which in turn is guided for horizontal motion relative to the table 20 by a dovetail connection 154.

A bar 155 is fixed to the bracket 153 and extends rearwardly therefrom. A cam follower roller 156 is rotatably connected to the rear end of the bar 155 and extends downwardly into a cam groove 157 formed in the upper surface of a cam 158. The cam 158 is fixed to a vertically extending shaft 159 rotatably supported by the table 20. A bevel gear 160 fixed to the forward end of the shaft 141 meshes with a bevel gear 161 fixed to the upper end of the shaft 159.

The mechanism for moving the lower finger assembly 22 is essentially the same as described above. Two mutilated drive pinions 163 and 164 are fixed to the drive shaft 143. The pinion 163 is adapted to mesh directly with a gear 165 fixed to a shaft 166, and the mutilated drive pinion 164 is adapted to mesh with a second gear 167 fixed to the shaft 166 through a reversing idler 168 mounted for rotation on a stub shaft 169. A normally engaged solenoid releasable brake 170 is mounted on the shaft 166 and is adapted to hold said shaft stationary whenever the mutilated pinions 163 and 164 are not in mesh.

A driving gear 171 is fixed to the shaft 166 and meshes with a vertically extending rack 172. A bracket 173 connects the rack 172 to the cross bar 34 of the lower finger assembly 22. The rack 172 is guided for vertical movement by a dovetail connection 174 with a vertical guide 175 fixed to a bracket 176. The bracket 176 is connected to the underside of the table 20 and is guided for movement forwardly and rearwardly thereof by a dovetail connection 177. A bar 178 is fixed to the bracket 176 and extends rearwardly therefrom. A cam follower roller 179 is rotatably mounted on the bar 178 and extends upwardly therefrom into a cam groove (not shown) formed in the lower surface of a cylindrical cam 180 fixed to the shaft 159. The cam groove of the cam 180 is the mirror image of the cam groove 157 on the cam 158 and is 180° out of phase therewith.

As can be seen from the above description, the raising and lowering of the upper finger assembly 21 is controlled by the mutilated drive pinions 144 and 145, while the lateral motion thereof is controlled by the cam 158. Similarly, the raising and lowering of the lower finger assembly 22 is controlled by the mutilated pinions 163 and 164, and the lateral motion by the cam 180.

As in the previous modification, the carriage 23 remains motionless at one end or the other of its path of travel while the movements of the finger assemblies are accomplished. The starting of the carriage drive at the completion of the finger assembly movement and the stopping of the finger assembly drive motor 71a is accomplished by means of two cam-operated micro-switches 77a and 78a corresponding to the switches 77 and 78 shown in Fig. 3. The switches 77a and 78a are actuated by two cams 181 and 182, respectively, fixed to the shaft 141 which rotates whenever the motor 77a is operating. Two additional cams 183 and 184 are fixed to the shaft 141 and actuate two microswitches 185 and 186 to time the energizing of the brakes 162 and 170 at the proper times during the cycle of the finger moving mechanism.

The wiring circuit for the modification shown in Figs. 12 to 17, inclusive, is illustrated in Fig. 18. Since the circuits through the relays 85, 86, 87 and 88 are the same as those shown in Fig. 3, they have not been reproduced herein in full. Only the wiring essential to the operation of the solenoid brakes 162 and 170 is shown in detail.

In the operation of this modification, when the carriage 23 actuates the limit switch 55, the carriage motor 52 stops and the brake 54 thereon engages. At the same time the brake 71a releases and the motor 72a starts in the same manner as described above. As soon as the motor 72a starts, the teeth on the mutilated pinion 144 mesh with the gear 146, and the cam switch is closed to release the brake 162 on the shaft 147. The shaft 147 is rotated counterclockwise as viewed in Fig. 16 to raise the rack 149a and with it the upper fingers 25. When the teeth on pinion 144 release, the cam switch 184 opens to allow the brake 162 to engage the shaft 147 and hold the fingers 25 in their raised position. In the meantime, the shaft 141 has moved the cam 158 a distance indicated by the arrow 190. Further rotation of the cam through the distance indicated by the arrow 191 causes the cam to force the upper fingers forwardly, or to the right as viewed in Figs. 12 and 13. During the period of rotation indicated by the arrow 192, the second mutilated pinion 145 rotates the shaft 147 in a reverse direction to lower the fingers 25. The pinion 145 then disengages and the brake 162 sets. During the period represented by the arrow 191, while the upper fingers were raised and being advanced the lower fingers were retracted against the upper and lower back up members 42 and 43 by the lower cam 180. During the period of rotation indicated by the arrow 193, the upper fingers 25 are moved by the cam 158 part way back into nesting engagement with the lower fingers 35. At the end of 180° of rotation of the shaft 141 and the cams 158 and 180, the cam switch 77a is actuated to stop the finger drive motor 71a, set the brake 72a, release the carriage drive brake 54, and start the carriage drive motor 52 in the opposite direction. At the other end of the path of travel of the carriage 23, the motor 71a is again actuated through the other 180° of rotation of the shaft 141 and the lower finger assembly 22 is actuated by the drive pinions 144 and 145 and by the lower cam 180.

The carriage mechanism 23 is adaptable for use with either of the finger moving mechanisms described above and is adapted for use either with the "Koldweld" process or with electrical welding. When used with the "Koldweld" process, the sprockets 60 and 63 are of the type illustrated in Figs. 19 and 20 wherein the sprocket 60 is shown to an enlarged scale. In this type of sprocket 60 the forming teeth 200 are provided with a plurality of outwardly extending tooth-like projections 201, whereby when the cylinder 57 forces the teeth 200 against the material backed up by the fingers 25 or 35, the projections 201 will apply sufficient localized pressure to cause the metal of the two layers of foil to flow together and thereby weld the layers together.

In the electrical type of welding, the sprockets 60 and 63 are replaced by sprockets such as illustrated at 60a in Fig. 21. The sprocket 60a is made of non-conducting material and is provided with forming teeth 202 having electrodes 203 embedded in each tooth adjacent the side edges thereof. The electrodes 203 are all connected to a ring electrode 204. In the use of the electrical welding modification, the ring electrode 204 is connected to one side of an electronic welding machine, and the fingers 25 and 35 are grounded to the other. The electronic welder is not illustrated since such welders are common. It is merely any electronic welder capable of being timed to emit a welding pulse of current as each tooth fully seats in its proper nested position with the fingers 25 and 35.

In the modification shown in Figs. 22 and 23, everything is the same as described in either of the modifications shown in Figs. 1 to 11 or 12 to 18, but the sprocket wheels 60 and 63 on the carriage 23 are replaced by a pair of hammer members 205 and 206. The hammer members 205 and 206 are actuated by solenoids 207 and 208, respectively, and returned by two return springs 209 and 210.

The solenoid 208 is electrically connected to a spring sliding contact 211 mounted in the base of the carriage 23 and is adapted to slide on a commutator bar 212 embedded in the upper surface of the auxiliary table 45. The commutator 212 is provided with a plurality of contacts 213 at spaced intervals therealong in such manner that the solenoid 208 will actuate the hammer 206, whenever the hammer is in register with one of the fingers 35. Similarly, the hammer 205 is electrically connected with a sliding contact (not shown) adapted to slide on a commutator bar 214 having a plurality of contacts 215 in register with the fingers 25.

The control circuits for the solenoids 207 and 208 are the same as those shown in Fig. 3 for the air cylinders 57 and 58, with the exception that the commutator bar 212 and sliding contact 211 are inserted in the line 101 and the commutator bar 214 and its associated sliding contact are inserted in the line 109.

As in the previous modifications, the hammers 205 and 206 may either be provided with projections for the "Koldweld" process or may be provided with electrodes for electrical welding.

In the operation of this modification, as the carriage moves to the right as viewed in Fig. 22, the commutator bar 214 is activated and the commutator bar 212 is deactivated, whereby the hammer 205 is actuated each time it comes into register with one of the fingers 25. When the carriage 23 moves in the opposite direction or to the left as viewed in Fig. 22, the commutator bar 212 is activated and the commutator bar 214 is de-activated, whereby the hammer 206 will be actuated each time it comes in register with one of the fingers 35.

In the modification shown in Figs. 24 and 25, either the finger moving mechanism illustrated in Figs. 1 to 11, or that illustrated in Figs. 12 to 18 may be used. However, in this modification the auxiliary table 220, on which the carriage mechanism generally indicated at 221 is mounted, is fixed to a bracket 222 hingedly connected to the underside at 223. The carriage 221 comprises a base 224 slidably mounted on the auxiliary table 220 by a pair of dovetail projections 225 and 226 slidably received in two dovetail grooves 227 and 228, respectively, formed in the upper surface of the auxiliary table 220. The same lead screw 51 meshes with the base 224, and is driven by the same motor 71 and brake 72 as described above with respect to the modification shown in Figs. 1 to 11. Similar, the same limit switches 55 and 56 are actuated by the frame 224 as were previously actuated by the carriage 23 in the first modification.

A sprocket 229 is rotatably mounted on a piston 230 which in turn is mounted in a cylinder 231 fixed to the frame 224. The piston is urged toward the fingers 25 and 35 by either a spring (not shown), or by air pressure applied to the rear of the cylinder 231. A yoke 232 is pivotally mounted to the piston 230, and slidably embraces an arcuate rack 233 to maintain the teeth 234 on the concave side thereof in mesh with the sprocket 229. As seen in Fig. 25, the rack 233 is T-shaped in cross section and the yoke 232 is provided with inwardly extending projections 235 which confine the head of the T between them and the sprocket 229. The convex side of the rack 233 is provided with a plurality of teeth 236 adapted to mesh with the fingers 25 and 35 when the rack 233 is rolled thereacross by the movement of the carriage 221. The auxiliary table 220 is held in its operative position relative to the table 20 by a latch mechanism indicated at 237 fixed to the main frame of the machine.

A material distributing guide 238, having a dovetail extension 299 extending downwardly from its lower surface, is mounted for lateral movement relative to the table 20, by having the dovetail extension 299 slidably received within a laterally extending dovetail groove 240 formed in the machine frame. Two pairs of guide rollers 241, 242, and 243, 244, respectively, are rotatably mounted on the guide 238.

In the operation of this modification, at the end of a stroke of the carriage 221 the latch 237 is released and the auxiliary table swings downwardly about the pivotal connection 223. The guide 238 then moves from one end to the other of its grooves 240, and the auxiliary table 220 is then pivoted back to its operative position and relatched. These operations take place during the movement of the fingers 25 or 35 as described above. The carriage 221 is now started in the opposite direction forcing the teeth 236 of the rack 233 against the material 69 to weld another row of cells of the finished product. As described above, the teeth 236 of the arcuate rack 233 may either be provided with projecting elements for using the "Koldweld" process, or may be provided with electrical terminals for electronic welding.

While I have shown and described several specific modifications of my invention, it should be understood that various changes may be made in their construction by those skilled in the art, without departing from the spirit of the invention as defined in the appended claims.

Having thus described my invention, what I claim and desire to secure by Letters Patent is:

1. A method of forming a metal foil cellular structure comprising training a strip of metal foil back and forth across the forwardmost surfaces of a pair of rows of forming fingers adapted to nest with each other, forming said foil strip around the fingers of the forwardmost row of fingers to form a row of cells, fastening the portions of the foil strip between the fingers of the forwardmost row of fingers to the previous layer of foil adjacent the forwardmost surface of the fingers of the rearmost row, withdrawing the fingers of the rearmost row from the completed cells and advancing them forwardly of the other row of fingers, moving the forwardmost row of fingers and the row of cells just completed rearwardly of the forwardly advancing fingers to the rearmost position between each of the back and forth movements of the foil strip.

2. A method of forming a metal foil cellular structure comprising training a strip of metal foil back and forth across the forwardmost surfaces of a pair of rows of forming fingers adapted to nest with each other, forming said foil strip around the fingers of the forwardmost row of fingers to form a row of cells, applying sufficient localized pressure to the portions of the foil strip between the fingers of the row of fingers to weld said portions to the previous layer of foil adjacent the forwardmost surface of the fingers of the other row, withdrawing the fingers of the rearmost row from the completed cells and advancing them forwardly of the other row of fingers, moving the forwardmost row of fingers and the row of cells just completed rearwardly of the forwardly advancing fingers to the rearmost position between each of the back and forth movements of the foil strip.

3. A method of forming a metal foil cellular structure comprising training a strip of metal foil back and forth across the forwardmost surfaces of a pair of rows of forming fingers adapted to nest with each other, forming said foil strip around the fingers of the forwardmost row of fingers to form a row of cells, electrically spot welding the portions of the foil strip between the fingers of the forwardmost row of fingers to the previous layer of foil adjacent the forwardmost surface of the fingers of the other row, withdrawing the fingers of the rearmost row from the completed cells and advancing them forwardly of the other row of fingers, moving the forwardmost row of fingers and the row of cells just completed rearwardly of the forwardly advancing fingers to the rearmost position between each of the back and forth movements of the foil strip.

4. An apparatus for forming a honeycomb structure comprising two rows of symmetrically-shaped forming fingers adapted to nest together, means for moving each of said rows of fingers alternately from one side of the other of said rows to the other side of the other of said rows, means for training a strip of metal foil along one side of said fingers, and means for forming said foil strip around said fingers into symmetric cells and fastening said foil between the fingers of the forwardmost row of fingers to the previous layer of foil between said rows of fingers.

5. An apparatus for forming a honeycomb structure comprising two rows of symmetrically-shaped forming fingers adapted to nest together, means for moving each of said rows of fingers alternately from one side of the other of said rows to the other side of the other of said rows, means for training a strip of metal foil along one side of said fingers, and means for forming said foil strip around said fingers into symmetric cells, said forming means applying sufficient localized pressure to the portions of said foil between the fingers of the forwardmost row of fingers to weld said portions to the previous layer of foil between said rows of fingers.

6. An apparatus for forming a honeycomb structure comprising two rows of symmetrically shaped forming fingers adapted to nest together, means for moving each of said rows of fingers alternately from one side of the other of said rows to the other side of the other of said rows, means for training a strip of metal foil along one side of said fingers, and means for forming said foil strip around said fingers into symmetric cells and electrically spot welding said foil between the fingers of the forwardmost row of fingers to the previous layer of foil between said rows of fingers.

7. An apparatus for forming a honeycomb structure comprising two rows of symmetrically shaped forming fingers adapted to nest together, means for moving each of said rows of fingers alternately from one side of the other of said rows to the other side of the other of said rows, means for training a strip of metal foil along one side of said fingers, and means including a sprocket adapted to intermesh with said fingers to form said foil strip around said fingers into symmetric cells and to weld said foil between the fingers of the forwardmost row of fingers to the previous layer of foil between said rows of fingers.

8. An apparatus for forming a honeycomb structure comprising two rows of symmetrically-shaped forming fingers adapted to nest together, means for moving each of said rows of fingers alternately from one side of the other of said rows to the other side of the other of said rows, means for training a strip of metal foil along one side of said fingers, and sprocket means adapted to intermesh with said fingers to form said foil strip around said fingers into symmetric cells, said sprocket means applying sufficient localized pressure to the portion of said foil between the fingers of the forwardmost row of fingers to weld said portions to the previous layer of foil between said rows of fingers.

9. An apparatus for forming a honeycomb structure comprising two rows of symmetrically-shaped forming fingers adapted to nest together, means for moving each of said rows of fingers alternately from one side of the other of said rows to the other side of the other of said rows, means for training a strip of metal foil along one side of said fingers, and means including a sprocket adapted to intermesh with said fingers to form said foil strip around said fingers into symmetric cells and to electrically spot weld said foil between the fingers of the forwardmost row of fingers to the previous layer of foil between said rows of fingers.

10. In an apparatus for forming a metal foil cellular product, a pair of rows of symmetrically-shaped forming fingers, the fingers of one row being staggered with relation to the fingers of the other row and adapted to nest therewith, a carriage guided for reciprocating movement parallel to and adjacent the forwardmost surfaces of said fingers, means on said carriage for training a strip of metal foil along the forwardmost surface of said fingers as said carriage moves therepast, means on said carriage for forming said metal foil strip around the forwardmost row of fingers and fastening the strip at the areas between the fingers thereof to the portion of said foil strip between said rows of fingers, means connected to said fingers adapted to move the rearmost row of fingers to the forwardmost position and to move the forwardmost row of fingers and the row of cells formed therearound to the rearmost position when the carriage reaches either end of its path of travel, and for subsequently initiating carriage movement in the opposite direction.

11. In an apparatus for forming a metal foil cellular product, a pair of rows of symmetrically-shaped forming fingers, the fingers of one row being staggered with relation to the fingers of the other row and adapted to nest therewith, a carriage guided for reciprocating movement parallel to and adjacent the forwardmost surfaces of said fingers, means on said carriage for training a strip of metal foil along the forwardmost surface of said fingers as said carriage moves therepast, means on said carriage for forming said metal foil strip around the forwardmost row of fingers, said forming means applying sufficient localized pressure to the portions of the strip between the fingers of the forwardmost fingers to weld said portions to the portion of said foil strip between said rows of fingers, means connected to said fingers adapted to move the rearmost row of fingers to the forwardmost position and to move the forwardmost row of fingers and the row of cells formed therearound to the rearmost position when the carriage reaches either end of its path of travel, and for subsequently initiating carriage movement in the opposite direction.

12. In an apparatus for forming a metal foil cellular product, a pair of rows of symmetrically-shaped forming fingers, the fingers of one row being staggered with relation to the fingers of the other row and adapted to nest therewith, a carriage guided for reciprocating movement parallel to and adjacent the forwardmost surfaces of said fingers, means on said carriage for training a strip of metal foil along the forwardmost surface of said fingers as said carriage moves therepast, means on said carriage for forming said metal foil strip around the forwardmost row of fingers and electrically spot welding the strip at the areas between the fingers thereof to the portion of said foil strip between said rows of fingers, means connected to said fingers adapted to move the rearmost row of fingers to the forwardmost position and to move the forwardmost row of fingers and the row of cells formed therearound to the rearmost position when the carriage reaches either end of its path of travel, and for subsequently initiating carriage movement in the opposite direction.

13. In an apparatus for forming a metal foil cellular product, a pair of rows of symmetrically-shaped forming fingers, the fingers of one row being staggered with relation to the fingers of the other row and adapted to nest therewith, a carriage guided for reciprocating movement parallel to and adjacent the forwardmost surfaces of said fingers, means on said carriage for training a strip of metal foil along the forwardmost surface of said fingers as said carriage moves therepast, means including a sprocket on said carriage adapted to intermesh with said fingers to form said metal foil strip around the forwardmost row of fingers and to weld the strip at the areas between the fingers thereof to the portion of said foil strip between said rows of fingers, means connected to said fingers adapted to move the rearmost row of fingers to the forwardmost position and to move the forwardmost row of fingers and the row of cells formed therearound to the rearmost position when the carriage reaches either end of its path of travel, and for subsequently initiating carriage movement in the opposite direction.

14. In an apparatus for forming a metal foil cellular product, a pair of rows of symmetrically-shaped forming fingers, the fingers of one row being staggered with relation to the fingers of the other row and adapted to nest therewith, a carriage guided for reciprocating movement parallel to and adjacent the forwardmost surfaces of said fingers, means on said carriage for training a strip of metal foil along the forwardmost surface of said fingers as said carriage moves therepast, sprocket means on said carriage adapted to intermesh with said fingers to form said metal foil strip around the forwardmost row of fingers, said sprocket means applying sufficient localized pressure to the portions of the strip between the fingers of the forwardmost fingers to weld said portions to the portion of said foil strip between said rows of fingers, means connected to said fingers adapted to move the rearmost row of fingers to the forwardmost position and to move the forwardmost row of fingers and the row of cells formed therearound to the rearmost position when the carriage reaches either end of its path of travel, and for subsequently initiating carriage movement in the opposite direction.

15. In an apparatus for forming a metal foil cellular product, a pair of rows of symmetrically-shaped forming fingers, the fingers of one row being staggered with relation to the fingers of the other row and adapted to nest therewith, a carriage guided for reciprocating movement parallel to and adjacent the forwardmost surfaces of said fingers, means on said carriage for training a strip of metal foil along the forwardmost surface of said fingers as said carriage moves therepast, means including a sprocket on said carriage adapted to intermesh with said fingers to form said metal foil strip around the forwardmost row of fingers and to electrically spot weld the strip at the areas between the fingers thereof to the portion of said foil strip between said rows of fingers, means connected to said fingers adapted to move the rearmost row of fingers to the forwardmost position and to move the forwardmost row of fingers and the row of cells formed therearound to the rearmost position when the carriage reaches either end of its path of travel, and for subsequently initiating carriage movement in the opposite direction.

16. In an apparatus for forming a metal foil cellular product, a first row of symmetrically-shaped forming fingers spaced laterally of the machine with their longitudinal axes extending transversely to the path of movement of the finished product; a second row of symmetrically-shaped forming fingers spaced laterally of the machine and out of register with the fingers of said first row and adapted to nest therewith; a carriage mounted on said machine for reciprocating movement laterally of said machine parallel to and adjacent the forwardmost surface of said forming fingers; means on said carriage for training a strip of metal foil along the forwardmost surface of the forwardmost row of fingers and for shaping said foil strip around said forwardmost row of fingers; means for fastening the portion thereof between the fingers of said forwardmost row to the previous foil layer between said rows during movement of said carriage in either direction; and means initiated upon completion of the carriage movement in said one direction for withdrawing the second row of said fingers from the completed cells, advancing said second row of fingers to said forwardmost position while simultaneously moving said first row of fingers to the rearmost position, reinserting said second row of fingers in nesting relation with the fingers of said first row, and initiating movement of said carriage in the opposite direction.

17. In an apparatus for forming a metal foil cellular product, a first row of symmetrically-shaped forming fingers spaced laterally of the machine with their longitudinal axes extending transversely to the path of movement of the finished product; a second row of symmetrically-shaped forming fingers spaced laterally of the machine and out of register with the fingers of said first row and adapted to nest therewith; a carriage mounted on said machine for reciprocating movement laterally of said machine parallel to and adjacent the forwardmost surface of said forming fingers; means on said carriage for training a strip of metal foil along the forwardmost surface of the forwardmost row of fingers and for forming said foil strip around said forwardmost row of fingers; means applying sufficient pressure to the portions of said strip between the fingers to weld said portions to the previous foil layer between said rows during movement of said carriage in either direction; and means initiated upon completion of the carriage movement in said one direction for withdrawing the second row of said fingers from the completed cells, advancing said second row of fingers to said forwardmost position while simultaneously moving said first row of fingers to the rearmost position, reinserting said second row of fingers in nesting relation with the fingers of said first row, and initiating movement of said carriage in the opposite direction.

18. In an apparatus for forming a metal foil cellular product, a first row of symmetrically-shaped forming fingers spaced laterally of the machine with their longitudinal axes extending transversely to the path of movement of the finished product; a second row of symmetrically-shaped forming fingers spaced laterally of the machine and out of register with the fingers of said first row and adapted to nest therewith; a carriage mounted on said machine for reciprocating movement laterally of said machine parallel to and adjacent the forwardmost surface of said forming fingers; means on said carriage for training a strip of metal foil along the forwardmost surface of the forwardmost row of fingers and for shaping said foil strip around said forwardmost row of fingers; means for electrically spot welding the portion thereof between the fingers of said forwardmost row to the previous foil layer between said rows during movement of said carriage in either direction; and means initiated upon completion of the carriage movement in said one direction for withdrawing the second row of said fingers from the completed cells, advancing said second row of fingers to said forwardmost position while simultaneously moving said first row of fingers to the rearmost position, reinserting said second row of fingers in nesting relation with the fingers of said first row, and initiating movement of said carriage in the opposite direction.

19. In an apparatus for forming a metal foil cellular product, a first row of symmetrically-shaped forming fingers spaced laterally of the machine with their longitudinal axes extending transversely to the path of movement of the finished product; a second row of symmetrically-shaped forming fingers spaced laterally of the machine and out of register with the fingers of said first row and adapted to nest therewith; a carriage mounted on said machine for reciprocating movement laterally of said machine parallel to and adjacent the forwardmost surface of said forming fingers; sprocket means on said carriage for training a strip of metal foil along the forwardmost surface of the forwardmost row of fingers and for shaping said foil strip around said forwardmost row of fingers; means for welding the portion thereof between the fingers of said row to the previous foil layer between said rows during movement of said carriage in either direction; and means initiated upon completion of the carriage movement in said one direction for withdrawing the second row of said fingers from the completed cells, advancing said second row of fingers to said forwardmost position while simultaneously moving said first row of fingers to the rearmost position, reinserting said second row of fingers in nesting relation with the fingers of said first row, and initiating movement of said carriage in the opposite direction.

20. In an apparatus for forming a metal foil cellular product, a first row of symmetrically-shaped forming fingers spaced laterally of the machine with their longitudinal axes extending transversely to the path of movement of the finished product; a second row of symmetrically-shaped forming fingers spaced laterally of the machine and out of register with the fingers of said first row and adapted to nest therewith; a carriage mounted on said machine for reciprocating movement laterally of said machine parallel to and adjacent the forwardmost surface of said forming fingers; sprocket means on said carriage for training a strip of metal foil along the forwardmost surface of the forwardmost row of fingers and for shaping said foil strip around said forwardmost row of fingers; means on said sprocket means for applying sufficient localized pressure to weld the portion of said strip between the fingers of said forwardmost row to the previous foil layer between said rows during movement of said carriage in either direction; and means initiated upon completion of the carriage movement in said one direction for withdrawing the second row of said fingers from the completed cells, advancing said second row of fingers to said forwardmost position while simultaneously moving said first row of fingers to the rearmost position, reinserting said second row of fingers in nesting relation with the fingers of said first row, and initiating movement of said carriage in the opposite direction.

21. In an apparatus for forming a metal foil cellular product; a first row of symmetrically-shaped forming fingers spaced laterally of the machine with their longitudinal axes extending transversely to the path of movement of the finished product; a second row of symmetrically-shaped forming fingers spaced laterally of the machine and out of register with the fingers of said first row and adapted to nest therewith; a carriage mounted on said machine for reciprocating movement laterally of said machine parallel to and adjacent the forwardmost surface of said forming fingers; sprocket means on said carriage for training a strip of metal foil along the forwardmost surface of the forwardmost row of fingers and for shaping said foil strip around said forwardmost row of fingers; electrodes on said sprocket means for electrically spot welding the portions of said strip between the fingers of said forwardmost row to the previous foil layer between said rows of fingers during the movement of said carriage in either direction; means initiated upon completion of the carriage movement in said one direction for withdrawing the second row of fingers from the previously completed cells, advancing said second row of fingers to said forwardmost position while simultaneously moving said first row of fingers to said rearmost position, reinserting said second row of fingers into nesting relation with said first row, and initiating movement of said carriage in the opposite direction.

References Cited in the file of this patent

UNITED STATES PATENTS

| | | |
|---|---|---|
| 1,117,770 | Boblett | Nov. 17, 1914 |
| 2,163,590 | Ganahl et al. | June 27, 1939 |
| 2,324,435 | Smith | July 13, 1943 |
| 2,427,597 | Garner et al. | Sept. 16, 1947 |
| 2,583,575 | Casson | Jan. 29, 1952 |
| 2,707,826 | Sowter | May 10, 1955 |

FOREIGN PATENTS

| | | |
|---|---|---|
| 145,672 | Great Britain | Dec. 30, 1921 |